United States Patent
Pavetic

(10) Patent No.: US 11,810,353 B2
(45) Date of Patent: *Nov. 7, 2023

(54) METHODS, SYSTEMS, AND MEDIA FOR DETECTING TWO-DIMENSIONAL VIDEOS PLACED ON A SPHERE IN ABUSIVE SPHERICAL VIDEO CONTENT

(71) Applicant: Google LLC, Mountain View, CA (US)

(72) Inventor: Filip Pavetic, Zurich (CH)

(73) Assignee: Google LLC, Mountain View, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 17/163,841

(22) Filed: Feb. 1, 2021

(65) Prior Publication Data

US 2021/0158050 A1 May 27, 2021

Related U.S. Application Data

(63) Continuation of application No. 16/418,399, filed on May 21, 2019, now Pat. No. 10,909,381.

(Continued)

(51) Int. Cl.
*G06V 20/40* (2022.01)
*G06F 21/16* (2013.01)
*G06T 3/00* (2006.01)

(52) U.S. Cl.
CPC .............. *G06V 20/46* (2022.01); *G06F 21/16* (2013.01); *G06T 3/0031* (2013.01); *G06V 20/48* (2022.01); *G06F 2221/0737* (2013.01)

(58) Field of Classification Search
CPC G06K 9/00744; G06K 9/00758; G06F 21/16; G06F 2221/0737; G06T 3/0031; G06V 20/46; G06V 20/48
See application file for complete search history.

(56) References Cited

U.S. PATENT DOCUMENTS

| 9,872,056 B1 | 1/2018 | Zamaraiev et al. |
| 2015/0125036 A1 | 5/2015 | Bilobrov |

(Continued)

FOREIGN PATENT DOCUMENTS

CN 106056531 10/2016

OTHER PUBLICATIONS

Jin et al: "Artwork Identification for 360-Degree Panoramic Images Using Polyhedron-Based Rectilinear Projection and Keypoint Shapes", 2017 (Year: 2017).*

(Continued)

*Primary Examiner* — Ruiping Li
(74) *Attorney, Agent, or Firm* — Shumaker & Sieffert, P.A.

(57) ABSTRACT

Methods, systems, and media for analyzing spherical video content are provided. More particularly, methods, systems, and media for detecting two-dimensional videos placed on a sphere in abusive spherical video content are provided. In some embodiments, the method comprises: receiving an identifier of a spherical video content item, wherein the spherical video content item has a plurality of views; selecting a first frame of the spherical video content item; projecting the first frame of the spherical video content item to a two-dimensional region using a projection defined by a mapping according to which neighboring points of the first frame are mapped to respective neighboring points of the region, and one or more contiguous portions of the frame are each mapped to a corresponding plurality of contiguous portions of the region; identifying an area within the region which meets a criterion indicative of the region having a likelihood above a threshold of including a particular type of content; in response to identifying the area within the region which meets the criterion, analyzing the identified area of the region using a video fingerprinting technique; and, in (Continued)

response to determining that content associated with the identified area of the region matches a reference content item of a plurality of reference content items using the video fingerprinting technique, generating an indication of the match in association with the identifier of the spherical video content item.

21 Claims, 8 Drawing Sheets

Related U.S. Application Data

(60) Provisional application No. 62/674,230, filed on May 21, 2018.

(56) References Cited

U.S. PATENT DOCUMENTS

| | | | |
|---|---|---|---|
| 2015/0254871 A1* | 9/2015 | MacMillan | H04L 65/612 382/180 |
| 2016/0352791 A1 | 12/2016 | Adams et al. | |
| 2017/0364752 A1 | 12/2017 | Zhou et al. | |
| 2018/0068410 A1 | 3/2018 | Pavetic et al. | |
| 2018/0109729 A1 | 4/2018 | Jang et al. | |

OTHER PUBLICATIONS

Examination Report dated Nov. 26, 2021 in IN Patent Application No. 202047038492.

Examination Report dated Nov. 29, 2021 in EP Patent Application No. 19731381.0.

Azevedo et al., "Visual Distortions in 360-degree Videos", Cornell University Library, Jan. 7, 2019, pp. 1-14.

Constine, J., "Facebook Launches Video Rights Manager to Combat Freebooting", in TechCruch, Apr. 12, 2016, pp. 1-2, available at: https://techcrunch.com/2016/04/12/content-fb/.

Dalton et al., "Rondo360: Dysonics' Spatial Audio Post-Production Toolkit for 360 Media", In the Proceedings of the 141st Audio Engineering Society Convention, Los Angeles, CA, US, Sep. 29-Oct. 2, 2016, pp. 1-4.

International Search Report and Written Opinion dated Jan. 10, 2018 in International Patent Application No. PCT/US2017/054259.

International Search Report and Written Opinion dated Sep. 9, 2019 in International Patent Application No. PCT/US2019/033284.

Jiang et al., "Recognizing Artwork in Panoramic Images Using Optimized ASIFT and Cubic Projection", in International Journal of Machine Learning and Computing, vol. 8, No. 1, Feb. 2018, pp. 54-60.

Jin et al., "Artwork Identification for 360-Degree Panoramic Images Using Polyhedron-Based Rectilinear Projection and Keypoint Shapes", in Applied Sciences, vol. 7, No. 5, May 19, 2017, pp. 1-25.

Notice of Allowance dated Jul. 5, 2019 in U.S. Appl. No. 15/380,535.

Notice of Allowance dated Oct. 2, 2020 in U.S. Appl. No. 16/418,399.

Notice of Allowance dated Oct. 22, 2020 in U.S. Appl. No. 16/715,498.

Office Action dated May 3, 2019 in U.S. Appl. No. 15/380,535.

Office Action dated Jun. 26, 2020 in U.S. Appl. No. 16/715,498.

Statt, N., "Genius Movie Pirate Sneaks Clueless into 360-degree YouTube video", in The Verge, Jun. 30, 2016, pp. 1-2.

Viola et al., "Rapid Object Detection Using a Boosted Cascade of Simple Features", in the Proceedings of the IEEE Computer Society Conference on Computer Vision and Pattern Recognition, Kauai, HI, US, Jan. 1, 2001, pp. 511-518.

* cited by examiner

METHODS, SYSTEMS, AND MEDIA FOR DETECTING TWO-DIMENSIONAL VIDEOS PLACED ON A SPHERE IN ABUSIVE SPHERICAL VIDEO CONTENT

CROSS-REFERENCE TO RELATED APPLICATION

This application is a continuation of U.S. patent application Ser. No. 16/418,399, filed May 21, 2019, which claims the benefit of U.S. Provisional Patent Application No. 62/674,230, filed May 21, 2018, each of which is hereby incorporated by reference herein in its entirety.

TECHNICAL FIELD

The disclosed subject matter relates to methods, systems, and media for analyzing spherical video content and, in some embodiments, detecting two-dimensional videos placed on a sphere in abusive spherical video content by tiling the sphere. More particularly, the disclosed subject matter relates to recognizing matches between content in spherical video content and one of a plurality of reference content items.

BACKGROUND

People frequently view video content via different video service providers, for example, by streaming content from a service provider. In many instances, this video content is compared against a database of reference video files to determine whether the video content matches one of the reference video files. For example, this facilitates a determination of whether the video content includes content that has been copyrighted by another content creator or entity.

Immersive or 360-degree spherical video content, which includes video content recorded from multiple views that can be manipulated and navigated through by a user, has become increasingly popular. However, it can be difficult to determine instances where copyrighted video content has been superimposed on, inserted into, or stitched together with spherical video content.

Accordingly, it is desirable to provide methods, systems, and media for analyzing spherical video content.

SUMMARY

New and useful methods, systems and media are provided for analyzing spherical video content.

In particular, the methods, systems, and media are provided for the technical problem of detecting matches between spherical video content and a plurality of reference content items.

In an example, the methods, systems and media may be used for detecting two-dimensional videos placed on a sphere in abusive spherical video content by tiling the sphere. In this case, the methods, systems and media may be used for detecting potentially copyrighted content. In another example, the methods, systems and media may be used for indexing the spherical video content, e.g., by assigning a label to the spherical video content which relates to a matching reference item. This permits an automated indexing procedure.

In accordance with some embodiments of the disclosed subject matter, a computer-implemented method for analyzing spherical video content is provided, the method comprising: receiving an identifier of a spherical video content item, wherein the spherical video content item has a plurality of views and wherein the spherical video content item is encoded into a plurality of two-dimensional video frames; selecting a first frame of the plurality of two-dimensional video frames associated with the spherical video content item; dividing the first frame into a plurality of tiles spanning the first frame of the spherical video content item; calculating, for each tile of the plurality of tiles, a probability (i.e., a probability value) that the tile includes content of a particular type of content; determining, for each tile, whether the probability exceeds a predetermined threshold; in response to determining, for a particular tile, that the probability exceeds the predetermined threshold, causing the content associated with the tile to be analyzed using a video fingerprinting technique; and, in response to determining, using the video fingerprinting technique, that the content associated with the tile matches a reference content item of a plurality of reference content items, generating an indication of the match in association with the identifier of the spherical video content item.

In some embodiments, the particular type of content includes content in motion.

In some embodiments, the particular type of content includes a face.

In some embodiments, the particular type of content includes an edge that is part of a border of a panel in which a video content item is inserted into the spherical video content item.

To put this differently, the particular type of content may include any one or more of the elements of the group consisting of: content which is in motion; content which includes a face; and content which includes an edge that is part of a border of a panel in which a video content item is inserted into the spherical video content item.

In some embodiments, the method further comprises determining a size of the tile.

In some embodiments, the method further comprises projecting the content associated with the tile onto a two-dimensional plane prior to causing the content associated with the tile to be analyzed using the video fingerprinting technique.

In some embodiments, the method further comprises inhibiting the spherical video content item from being presented in response to the content associated with the tile matching the reference content item of the plurality of reference content items.

In some embodiments, the method further comprises, in response to determining that the probability for the particular tile does not exceed the predetermined threshold, discarding the particular tile by inhibiting the content associated with the particular tile from being analyzed using the video fingerprinting technique.

In accordance with some embodiments of the disclosed subject matter, a system for analyzing spherical video content is provided, the system comprising: a memory storing computer-executable instructions; and a hardware processor that, when executing the computer-executable instructions stored in the memory, is configured to: receive an identifier of a spherical video content item, wherein the spherical video content item has a plurality of views and wherein the spherical video content item is encoded into a plurality of two-dimensional video frames; select a first frame of the plurality of two-dimensional video frames associated with the spherical video content item; divide the first frame into a plurality of tiles spanning the first frame of the spherical video content item; calculate, for each tile of the plurality of tiles, a probability that the tile includes content of a particular type of content; determine, for each tile, whether the probability exceeds a predetermined threshold; in response to determining, for a particular tile, that the probability exceeds the predetermined threshold, cause the content associated with the tile to be analyzed using a video fingerprinting technique; and, in response to determining, using the video fingerprinting technique, that the content associated with the tile matches a reference content item of a plurality of reference content items, generate an indication of the match in association with the identifier of the spherical video content item.

In accordance with some embodiments of the disclosed subject matter, a computer program product (e.g., a computer readable medium, which may be a non-transitory computer-readable medium) containing computer-executable instructions that, when executed by a processor, cause the processor to perform a method for analyzing spherical video content is provided, the method comprising: receiving an identifier of a spherical video content item, wherein the spherical video content item has a plurality of views and wherein the spherical video content item is encoded into a plurality of two-dimensional video frames; selecting a first frame of the plurality of two-dimensional video frames associated with the spherical video content item; dividing the first frame into a plurality of tiles spanning the first frame of the spherical video content item; calculating, for each tile of the plurality of tiles, a probability that the tile includes content of a particular type of content; determining, for each tile, whether the probability exceeds a predetermined threshold; in response to determining, for a particular tile, that the probability exceeds the predetermined threshold, causing the content associated with the tile to be analyzed using a video fingerprinting technique; and, in response to determining, using the video fingerprinting technique, that the content associated with the tile matches a reference content item of a plurality of reference content items, generating an indication of the match in association with the identifier of the spherical video content item.

In accordance with some embodiments of the disclosed subject matter, a system for analyzing spherical video content is provided, the system comprising: means for receiving an identifier of a spherical video content item, wherein the spherical video content item has a plurality of views and wherein the spherical video content item is encoded into a plurality of two-dimensional video frames; means for selecting a first frame of the plurality of two-dimensional video frames associated with the spherical video content item; means for dividing the first frame into a plurality of tiles spanning the first frame of the spherical video content item; means for calculating, for each tile of the plurality of tiles, a probability that the tile includes content of a particular type of content; means for determining, for each tile, whether the probability exceeds a predetermined threshold; in response to determining, for a particular tile, that the probability exceeds the predetermined threshold, means for causing the content associated with the tile to be analyzed using a video fingerprinting technique; and, in response to determining, using the video fingerprinting technique, that the content associated with the tile matches a reference content item of a plurality of reference content items, means for generating an indication of the match in association with the identifier of the spherical video content item.

In accordance with some embodiments of the disclosed subject matter, a method for analyzing spherical video content is provided, the method comprising: receiving an identifier of a spherical video content item, wherein the spherical video content item has a plurality of views; selecting a first frame of the spherical video content item; projecting the first frame of the spherical video content item to a two-dimensional region using a projection defined by a mapping according to which neighboring points of the first frame are mapped to respective neighboring points of the region, and one or more contiguous portions of the frame are each mapped to a corresponding plurality of contiguous portions of the region; identifying an area within the region which meets a criterion indicative of the region having a likelihood above a threshold of including a particular type of content; in response to identifying the area within the region which meets the criterion, analyzing the identified area of the region using a video fingerprinting technique; and, in response to determining that content associated with the identified area of the region matches a reference content item of a plurality of reference content items using the video fingerprinting technique, generating an indication of the match in association with the identifier of the spherical video content item.

In some embodiments, two or more spaced apart contiguous portions of the frame are each mapped to two corresponding portions of the region.

In some embodiments, the two-dimensional region is spanned by first and second transverse axes, and wherein a first contiguous portion of the frame is mapped to two portions of the region which have different positions with respect to the first axis and a second contiguous portion of the frame is mapped to two portions of the region which have different positions with respect to the second axis.

In some embodiments, the method further comprises defining a coordinate system for the frame based on a latitude and a longitude, wherein the longitude corresponds to the first axis and the latitude corresponds to the second axis.

In some embodiments, the first contiguous portion of the sphere includes a pole according to the coordinate system.

In some embodiments, the method further comprises, in response to determining that content associated with the identified area of the modified equirectangular projection matches the reference content item using the video fingerprinting technique, blocking the spherical video content item from presentation on a user device.

In some embodiments, identifying the region which meets the criterion indicative of the region having the likelihood above the threshold of including the particular type of content is based on an object recognition technique applied to the projection.

In some embodiments, the particular type of content included in the identified area within the region is a two-dimensional video content item.

In some embodiments, the plurality of reference content items is a plurality of copyrighted media content items.

In some embodiments, the method further comprises analyzing audio content associated with the spherical video content item using an audio fingerprinting technique.

In accordance with some embodiments of the disclosed subject matter, a system for analyzing spherical video content is provided, the system comprising: a memory storing computer-executable instructions; and a hardware processor that, when executing the computer-executable instructions stored in the memory, is configured to: receive an identifier of a spherical video content item, wherein the spherical video content item has a plurality of views; select a first frame of the spherical video content item; project the first frame of the spherical video content item to a two-dimensional region using a projection defined by a mapping according to which neighboring points of the first frame are mapped to respective neighboring points of the region, and one or more contiguous portions of the frame are each mapped to a corresponding plurality of contiguous portions of the region; identify an area within the region which meets a criterion indicative of the region having a likelihood above a threshold of including a particular type of content; in response to identifying the area within the region which meets the criterion, analyze the identified area of the region using a video fingerprinting technique; and, in response to determining that content associated with the identified area of the region matches a reference content item of a plurality of reference content items using the video fingerprinting technique, generating an indication of the match in association with the identifier of the spherical video content item.

In accordance with some embodiments of the disclosed subject matter, a computer program product (e.g., a computer readable medium, which may be a non-transitory computer-readable medium) containing computer-executable instructions that, when executed by a processor, cause the processor to perform a method for analyzing spherical video content is provided, the method comprising: receiving an identifier of a spherical video content item, wherein the spherical video content item has a plurality of views; selecting a first frame of the spherical video content item; projecting the first frame of the spherical video content item to a two-dimensional region using a projection defined by a mapping according to which neighboring points of the first frame are mapped to respective neighboring points of the region, and one or more contiguous portions of the frame are each mapped to a corresponding plurality of contiguous portions of the region; identifying an area within the region which meets a criterion indicative of the region having a likelihood above a threshold of including a particular type of content; in response to identifying the area within the region which meets the criterion, analyzing the identified area of the region using a video fingerprinting technique; and, in response to determining that content associated with the identified area of the region matches a reference content item of a plurality of reference content items using the video fingerprinting technique, generating an indication of the match in association with the identifier of the spherical video content item.

In accordance with some embodiments of the disclosed subject matter, a system for analyzing spherical video content is provided, the system comprising: means for receiving an identifier of a spherical video content item, wherein the spherical video content item has a plurality of views; means for selecting a first frame of the spherical video content item; means for projecting the first frame of the spherical video content item to a two-dimensional region using a projection defined by a mapping according to which neighboring points of the first frame are mapped to respective neighboring points of the region, and one or more contiguous portions of the frame are each mapped to a corresponding plurality of contiguous portions of the region; means for identifying an area within the region which meets a criterion indicative of the region having a likelihood above a threshold of including a particular type of content; means for analyzing the identified area of the region using a video fingerprinting technique in response to identifying the area within the region which meets the criterion; and means for generating an indication of the match in association with the identifier of the spherical video content item in response to determining that content associated with the identified area of the region matches a reference content item of a plurality of reference content items using the video fingerprinting technique.

The embodiments of the disclosed subject matter may have the technical effect that matches between the spherical video content and the reference content items can be reliably identified substantially without human involvement in the process (i.e., automatically), or at least that candidate matches can be identified for subsequent evaluation by another technique (such as by a human operator).

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
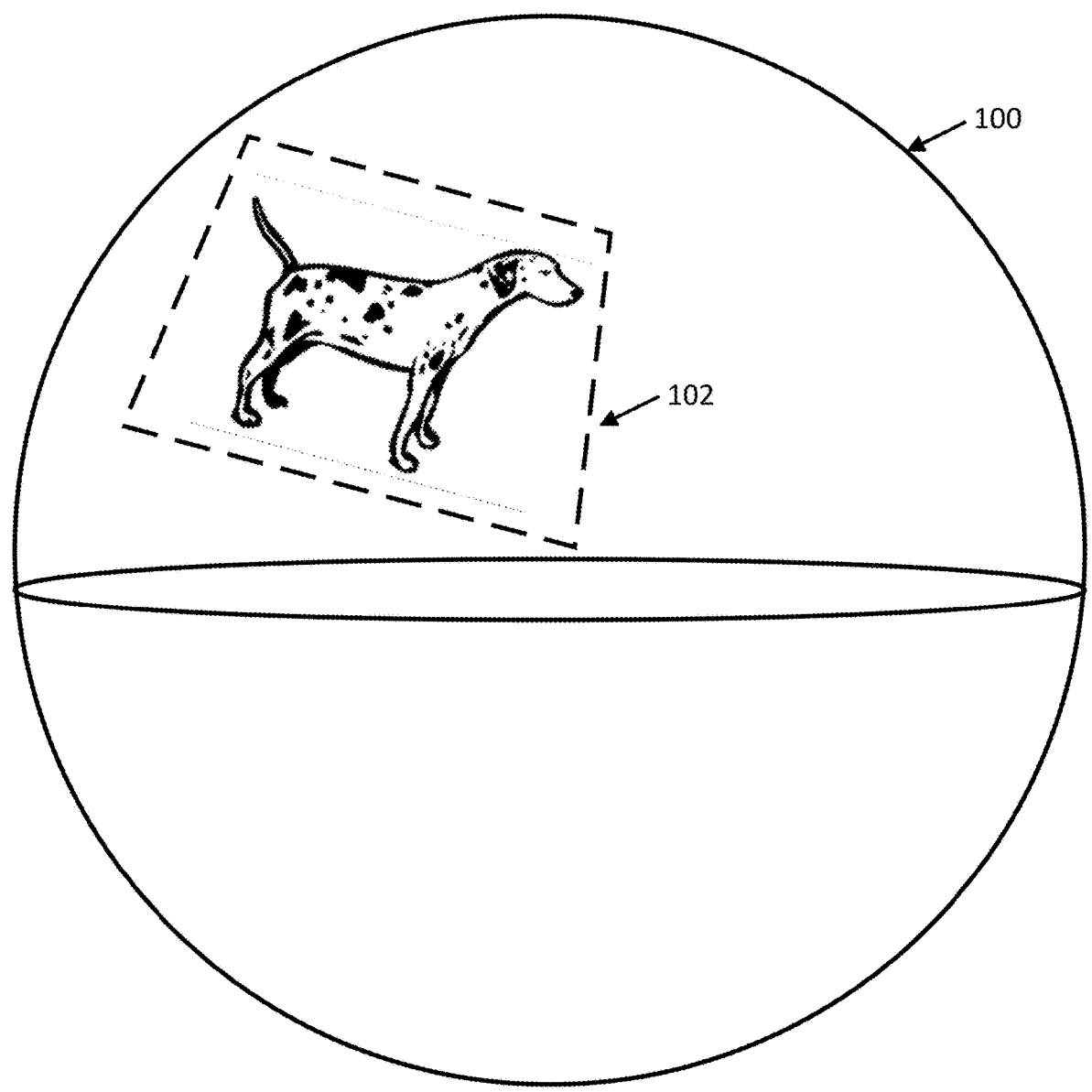
FIGS. 1A, 1B, 1C, and 1D show illustrative examples of schematic diagrams for detecting potentially copyrighted content in spherical video content in accordance with some embodiments of the disclosed subject matter.

In accordance with various embodiments, mechanisms (which can include methods, systems, and media) for detecting two-dimensional videos placed on a sphere in abusive spherical video content by tiling the sphere are provided.

In some embodiments, the mechanisms described herein can be used to detect particular types of video content superimposed on and/or stitched together with spherical video content. For example, in some embodiments, the mechanisms can be used to detect potentially copyrighted video content or potentially copyrighted audio content that has been superimposed on or inserted into spherical video content. It should be noted that various fingerprinting techniques have been used to identify copyrighted content, for example, by matching a portion of a content item to a reference content item in a database of reference content items. However, these fingerprinting techniques are sometimes unable to identify copyrighted video content that has been inserted into a spherical video content item. In particular, in some instances, the copyrighted video content may be inserted at a non-default viewing location of the spherical video content, which may make it difficult for these fingerprinting techniques to identify the location of the spherical video content at which the copyrighted video content is inserted. Additionally, in instances where the spherical video content is encoded as two-dimensional content, the copyrighted video content may be distorted, which may also make it difficult for video fingerprinting techniques to match the content to an undistorted reference content item.

In some embodiments, the mechanisms described herein can process the spherical video content item (as described in more detail herein) prior to applying one or more fingerprinting techniques to the processed spherical video content item to detect and identify particular video content items, such as potentially copyrighted video content items. For example, the mechanisms described herein can process the spherical video content item to determine whether the spherical video content item is likely to contain a full movie in a non-default viewport prior to applying one or more fingerprinting techniques that compare the content against one or more two-dimensional reference files.

Note that, as described herein, spherical video content refers to video content recorded (e.g., simultaneously) from multiple views using any suitable number of cameras (e.g., one, two, five, and/or any other suitable number) that is stitched together to form an image that spans any suitable spatial range about an axis (e.g., 180-degrees, 270-degrees, 360-degrees, and/or any other suitable spatial range). More particularly, in some embodiments, multiple views of the same scene in various directions can be recorded at the same time by one or more video capture devices, and the resulting video content can be stitched together to allow a user to change a viewpoint of the spherical video content. For example, in some embodiments, a user can manipulate a viewpoint of the spherical video content by clicking and/or dragging the spherical video content with a user input device (e.g., when using a touch-sensitive display), changing the user's gaze point (e.g., when using a gaze-tracking device associated with a user device presenting the spherical video content), and/or manipulate the spherical video content in any other suitable manner, thereby causing a viewpoint of the spherical video content to be correspondingly rotated. Additionally, as described herein, a viewport of the spherical video content item can be described as a portion of the spherical video content item viewed by a viewer located at a center of a sphere represented by the spherical video content item looking in a particular direction.

In some embodiments, the mechanisms described herein can divide a frame of the spherical video content into multiple tiles, and can determine whether each tile is likely to include content that is to be further analyzed (e.g., analyzed with fingerprinting techniques to determine if the content corresponds to copyrighted content, and/or analyzed further in any other suitable manner). In some embodiments, the mechanisms described herein can calculate, for each tile, a probability that the tile contains content that is to be further analyzed, and can discard the tile if the probability does not exceed a predetermined threshold. Alternatively, in instances where the probability for a tile does exceed the predetermined threshold, the content of the tile can then be further analyzed, for example, using one or more fingerprinting techniques (e.g., video fingerprinting, audio fingerprinting, and/or any suitable combination thereof) to identify spherical video content items that include particular video content items superimposed and/or inserted in the spherical video content.

In some embodiments, the probability for a tile can indicate a likelihood that content corresponding to the tile includes motion, a likelihood that content of the tile includes objects of a particular type (e.g., faces, logos, text, and/or any other suitable type of object), a likelihood that the content of the tile includes a border, an edge, and/or any other suitable visual feature, and/or any other suitable information.

In some embodiments, spherical video content items that include one or more tiles that exceed the predetermined threshold can be flagged with a suitable indication. For example, in some embodiments, an indication can be stored in connection with an identifier of the spherical video content item indicating a frame number at which content that matches content in a reference database was found, an identifier of the matching reference content item, and/or any other suitable information. In some such embodiments, the spherical video content item can be flagged for manual review, for example, by placing an identifier of the flagged spherical video content item in a queue of content items to be reviewed manually. Alternatively, the presentation of the spherical video content item can be inhibited or altered (e.g., by replacing it with a message interface, by distorting the video or audio content, by not allowing the user to navigate within the three-dimensional space of the spherical video content item, etc.).

In some embodiments, the mechanisms described herein can identify a portion of a frame of a spherical video content item likely to contain an embedded video item. In some embodiments, the mechanisms can then perform further analysis on the identified portion of the frame of the spherical video content item, for example, by performing a fingerprint analysis on the portion of the frame to identify an embedded video item.

In some embodiments, the mechanisms can identify the portion of the frame of the spherical video content item using any suitable techniques. For example, in some embodiments, the mechanisms can project the frame of the spherical video content item using a projection, such as a modified equirectangular projection, that expands the spherical image and wraps the expanded spherical image through the equator and around poles of the sphere, thereby allowing a video item embedded anywhere along the sphere (that is, including edges of the equirectangular projection and/or at the poles) to be identified within the modified equirectangular projection.

In another example, the mechanisms can select a frame of the spherical video content item and can project the frame of the spherical video content item to a two-dimensional region using a projection defined by a mapping according to which neighboring points of the frame are mapped to respective neighboring points of the region, and one or more contiguous portions of the frame are each mapped to a corresponding plurality of contiguous portions of the region. In continuing this example, two or more spaced apart contiguous portions of the frame can be each mapped to two corresponding portions of the region. It should be noted that the two-dimensional region can be spanned by first and second transverse axes, where a first contiguous portion of the frame can be mapped to two portions of the region which have different positions with respect to the first axis and a second contiguous portion of the frame can be mapped to two portions of the region which have different positions with respect to the second axis. In some embodiments, the mechanisms can define a coordinate system for the frame based on a latitude and a longitude, where the longitude corresponds to the first axis and the latitude corresponds to the second axis and where the first contiguous portion of the sphere includes a pole according to the coordinate system.

More detailed techniques for identifying a portion of a frame of a spherical video content item likely to include an embedded video item (e.g., identifying an area within a two-dimensional projected region of a selected frame which meets a criterion indicative of the region having a likelihood above a threshold of including an embedded video content item) are shown in and described below in connection with FIGS. 5 and 6.

It should be noted that this mechanism can be performed at any suitable time. For example, the mechanisms can be performed in response to a request to upload a spherical video content item to a content database. In a more particular example, the mechanisms can be used to perform a fingerprint analysis to identify an embedded video item within a spherical video content item at the time of upload (e.g., as opposed to offline processing). In another more particular example, the mechanisms can determine whether to use (i) a first mechanism that performs a fingerprint analysis to identify an embedded video item within a spherical video content item at the time of upload or (ii) a second mechanism that divides a frame of the spherical video content into multiple tiles and that determines whether each tile is likely to include content that is to be further analyzed.

These and other features for analyzing spherical video content are described herein in connection with FIGS. 1A-6.

Turning to FIG. 1A, an illustrative example of a schematic diagram of a frame of a spherical video content item is shown in accordance with some embodiments of the disclosed subject matter. As shown in FIG. 1A, a frame of spherical video content item 100 can include video content that has been recorded from multiple viewpoints of any suitable number of cameras (one, two, five, and/or any other suitable number) and that has been stitched together to create a content item that can be navigated through. For example, in some embodiments, spherical video content item 100 can be presented to a user as if the user is located at the center of a sphere representing spherical video content item 100 and is viewing spherical video content item 100 through a viewport, and the user can manipulate a viewpoint by rotating spherical video content item 100 around the viewport. In some such embodiments, manipulations of the viewpoint can be received via any suitable user inputs, such as mouse clicks or drags, inputs from a touch screen associated with a user device, and/or any other suitable user inputs.

In some embodiments, spherical video content item 100 can be divided into multiple tiles, such as tile 102 as shown in FIG. 1A. In some embodiments, tile 102 can be of any suitable size. For example, in some embodiments, tile 102 can correspond to a size of the viewport if a viewer at the center of the sphere representing spherical video content 100 were looking at tile 102, as described below in connection with FIG. 4. Additionally or alternatively, in some embodiments, tile 102 can be smaller or larger than a size of the viewport.

Figure 1B:
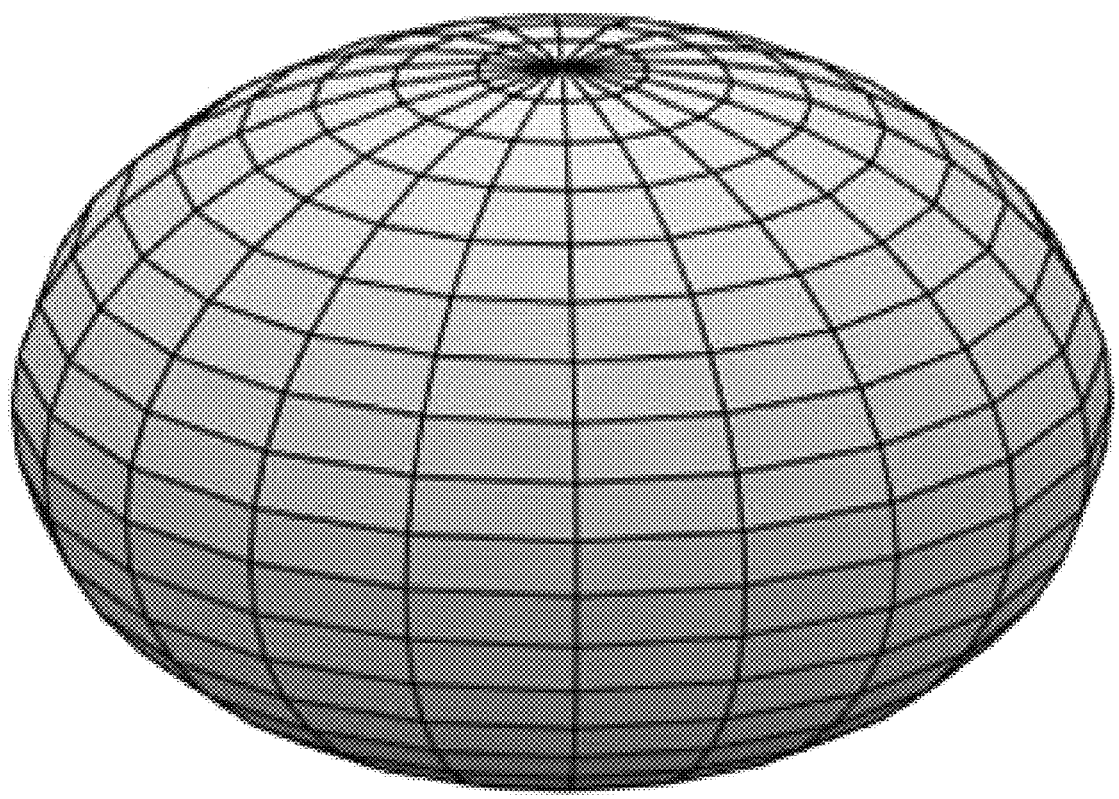

In a more particular example, FIG. 1B shows an illustrative example of a sphere representing the surface on which spherical video content item 100 can be presented, where the surface of the sphere has been divided into multiple tiles. It should be noted that spherical video content item 100 can be divided into tiles of any suitable size (e.g., a size corresponding to a size of the viewport, a default size, etc.). For example, spherical video content item 100 can be divided into tiles of varying size, where a particular group of tiles are configured to be a particular size and another particular group of tiles are configured to be a different size. It should also be noted that, although FIG. 1B generally shows that spherical video content item 100 is divided into tiles having a rectangular shape, this is merely illustrative and spherical video content item 100 can be divided into tiles of any suitable shape.

Figure 1C:
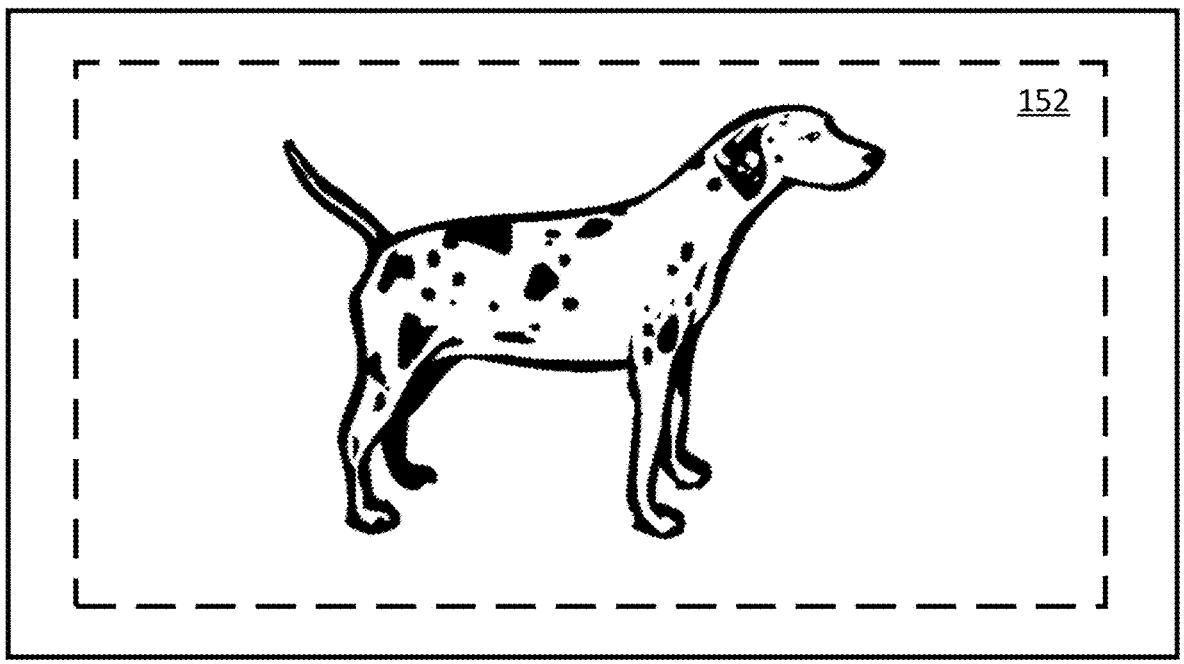
Figure 1D:
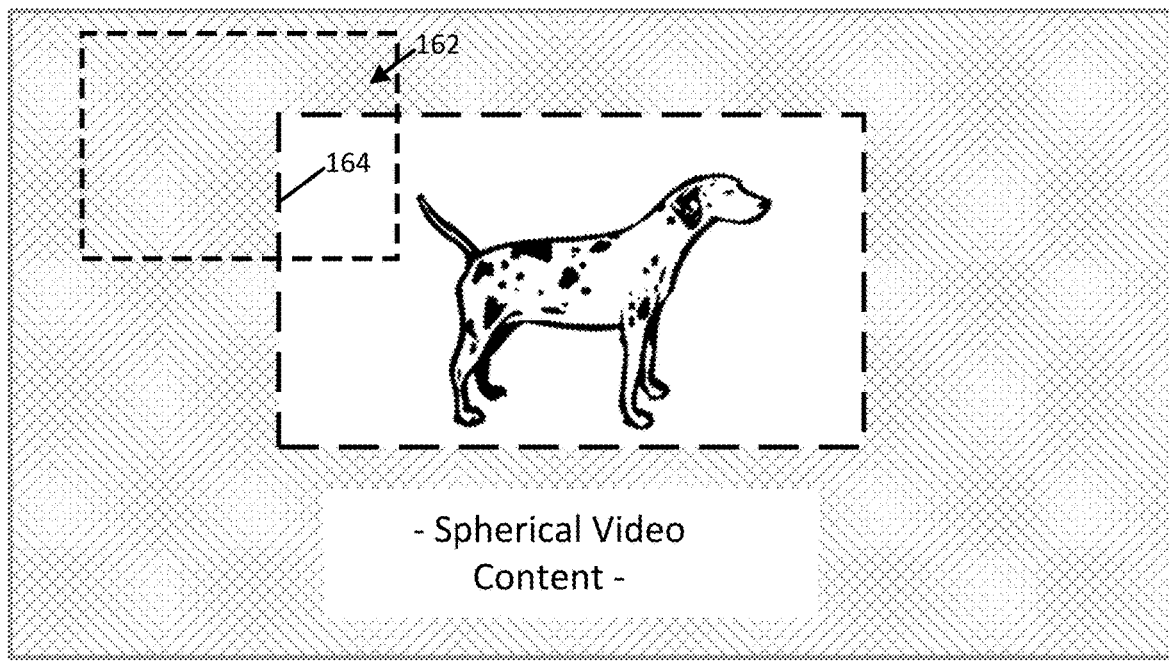

In some embodiments, referring back to FIG. 1A, the content of tile 102 (or any other tile) can be analyzed, for example, to determine whether the content is part of a particular video content item (e.g., a copyrighted video content item, and/or any other suitable video content item). More particular techniques for analyzing the content of tile 102 are further described in connection with FIG. 4. In some embodiments, tile 102 can be manipulated in any suitable manner to perform analysis of content of tile 102. For example, as shown in FIG. 1C, a shape of tile 102 can be modified to create a modified tile 152. As a more particular example, as shown in FIGS. 1A and 1C, tile 102 from spherical video content 100 can be projected onto a two-dimensional plane to form a rectangular modified tile, as described in more detail in connection with FIG. 4.

Figure 2:
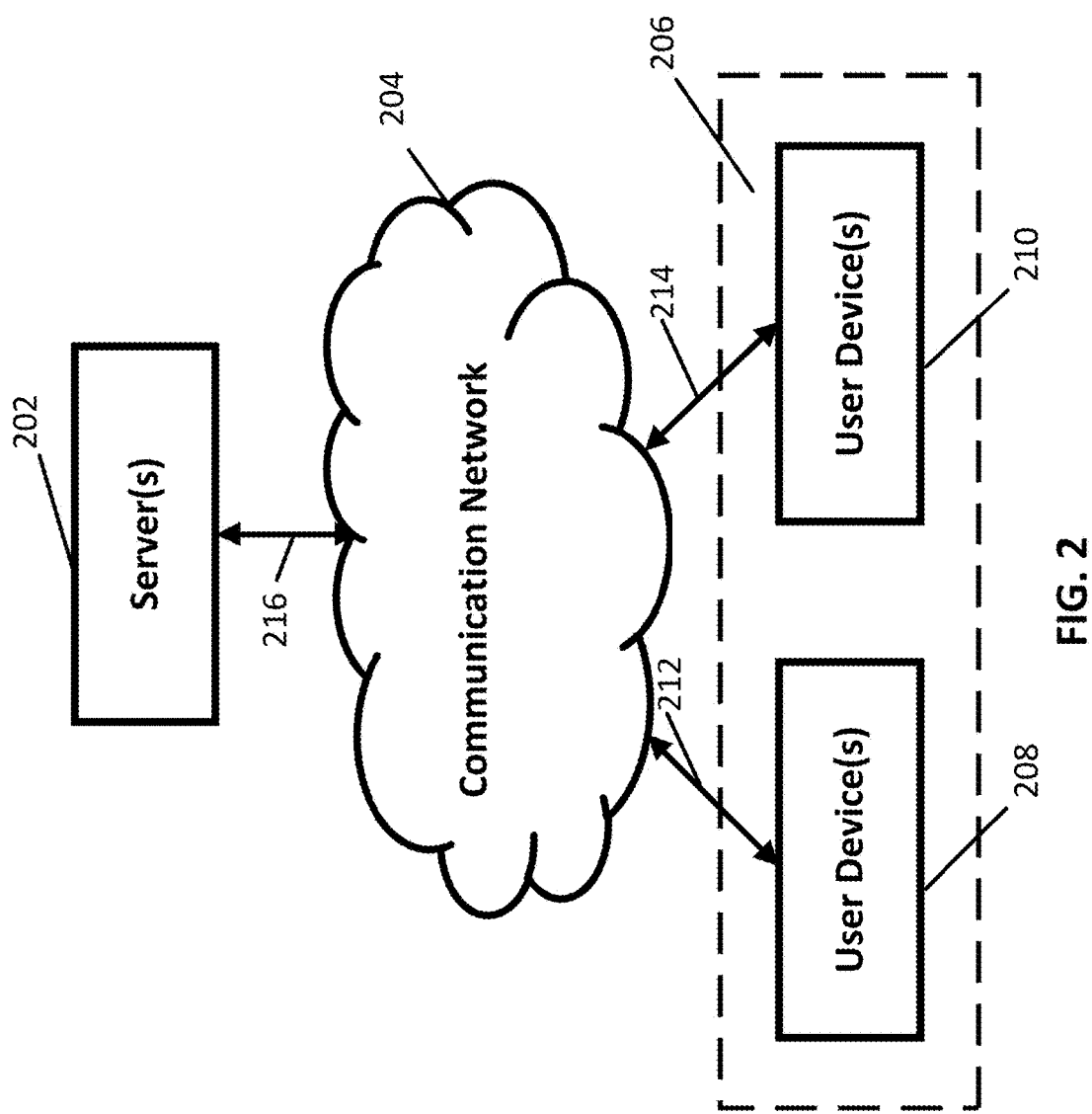
FIG. 2 shows a schematic diagram of an illustrative system suitable for implementation of mechanisms described herein for detecting potentially copyrighted content in spherical video content in accordance with some embodiments of the disclosed subject matter.
Figure 3:
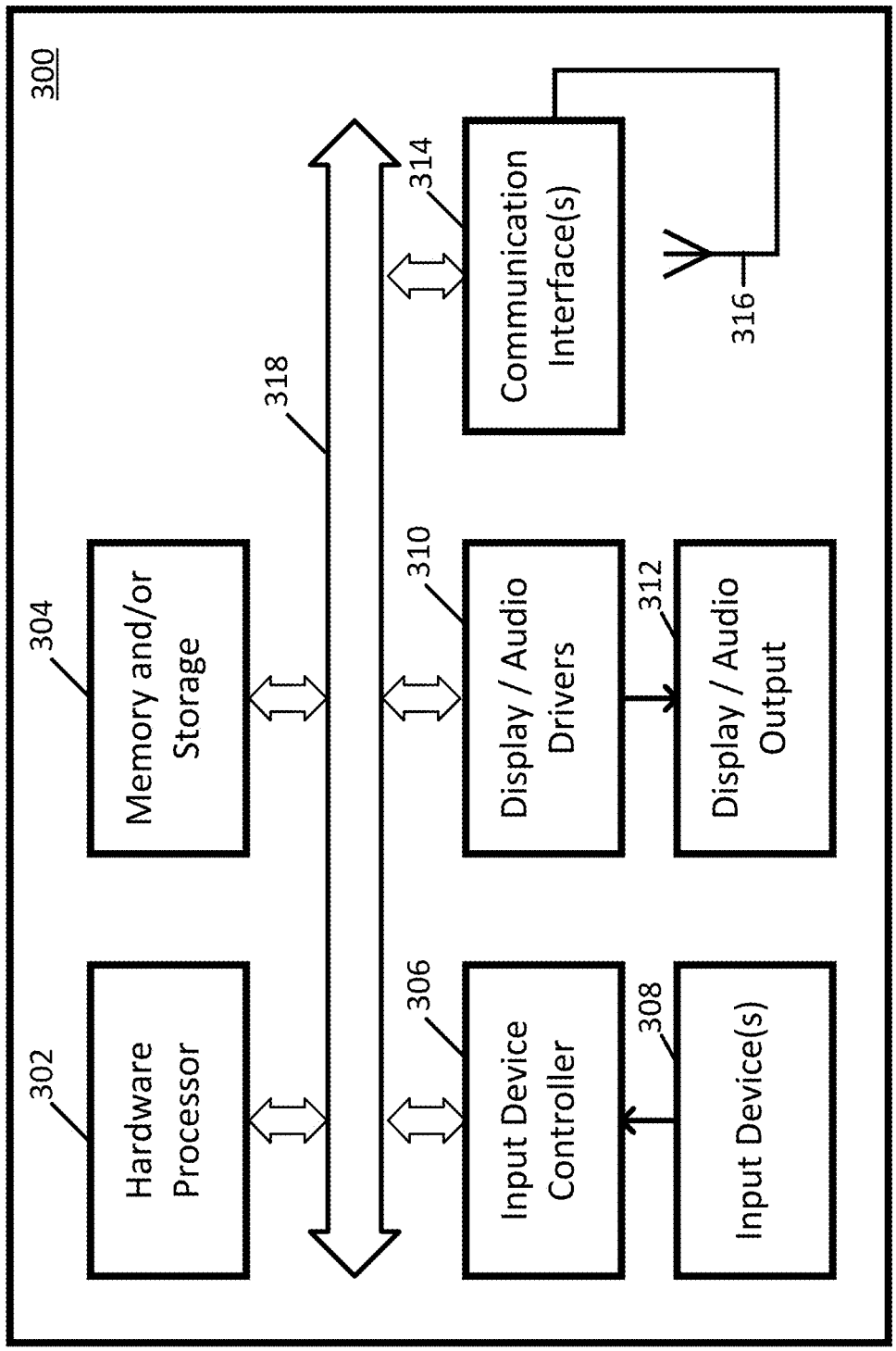
FIG. 3 shows a detailed example of hardware that can be used in a server and/or a user device of FIG. 2 in accordance with some embodiments of the disclosed subject matter.

Turning to FIG. 2, an example 200 of hardware for analyzing spherical video content that can be used in accordance with some embodiments of the disclosed subject matter is shown. As illustrated, hardware 200 can include one or more servers such as a server 202, a communication network 204, and/or one or more user devices 206, such as user devices 208 and 210.

Figure 4:
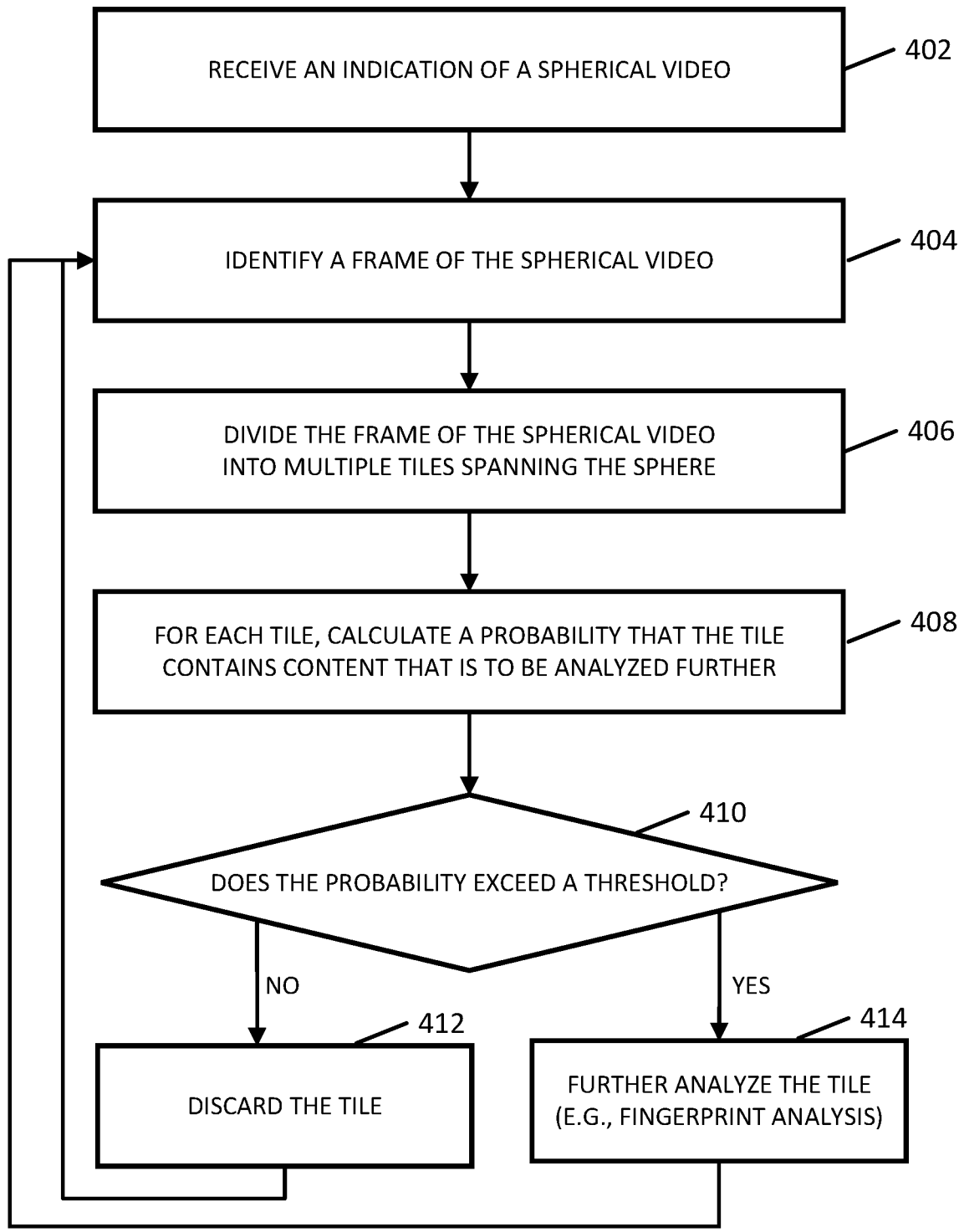
FIG. 4 shows an illustrative example of a process for detecting potentially copyrighted content in spherical video content in accordance with some embodiments of the disclosed subject matter.

In some embodiments, server(s) 202 can be any suitable server(s) for storing video content, analyzing video content, transmitting video content to user device 206, and/or performing any other suitable function. In some embodiments, the video content can include spherical video content, which can include video content recorded from multiple views and stitched together to form video content that spans any suitable spatial extent (e.g., 270 degrees, 360 degrees, and/or any other spatial range) that can be navigated and/or manipulated (e.g., via user inputs). In some such embodiments, server(s) 202 can perform any suitable functions for analyzing the spherical video content. For example, as shown in and described below in connection with FIG. 4, in some embodiments, server(s) 202 can divide the spherical video content into multiple tiles that compose the spherical video content and can analyze the tiles to determine whether the spherical video content includes a specific video content item. In some embodiments, server(s) 202 can be omitted, such that the method of FIG. 4 is performed instead for example on the user devices 206.

Communication network 204 can be any suitable combination of one or more wired and/or wireless networks in some embodiments. For example, communication network 206 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links 212 to communication network 204 that can be linked via one or more communications links (e.g., communications link 216) to server(s) 202. Communications links 212 and/or 214 can be any communications links suitable for communicating data among user devices 206 and server(s) 202 such as network links, dial-up links, wireless links, hard-wired links, any other suitable communications links, or any suitable combination of such links.

In some embodiments, user devices 206 can include one or more computing devices suitable for requesting video content, viewing video content, changing a view of video content, and/or any other suitable functions. For example, in some embodiments, user devices 206 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 206 can be implemented as a non-mobile device such as a desktop computer, a set-top box, a television, a streaming media player, a game console, and/or any other suitable non-mobile device.

Although server 202 is illustrated as a single device, the functions performed by server 202 can be performed using any suitable number of devices in some embodiments. For example, in some embodiments, the functions performed by server 202 can be performed on a single server. As another example, in some embodiments, multiple devices can be used to implement the functions performed by server 202.

Although two user devices 208 and 210 are shown in FIG. 2, any suitable number of user devices, and/or any suitable types of user devices, can be used in some embodiments.

Server(s) 202 and user devices 206 can be implemented using any suitable hardware in some embodiments. For example, in some embodiments, devices 202 and 206 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as server 202). For example, the server program can cause hardware processor 302 to analyze video content stored on server 202, transmit video content to user device 206, and/or perform any other suitable actions. In some embodiments, hardware processor 302 can be controlled by a computer program stored in memory and/or storage 304 of user device 206. For example, the computer program can cause hardware processor 302 to present video content, change a view of the video content, and/or perform any other suitable actions.

Memory and/or storage 304 can be any suitable memory and/or storage for storing programs, data, media content, advertisements, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Turning to FIG. 4, an example 400 of a process for analyzing spherical video content is shown in accordance with some embodiments of the disclosed subject matter. In some embodiments, blocks of process 400 can be implemented on server(s) 202.

Process 400 can begin by receiving an indication of a spherical video content item at 402. In some embodiments, the indication can be received in any suitable manner. For example, in some embodiments, process 400 can detect that the spherical video content item has been uploaded to server(s) 202 by a content creator (e.g., using an interface for uploading a video content item, using an application programming interface for uploading multiple video content items that can include a spherical video content item, etc.). As another example, in some embodiments, process 400 can process a group of spherical video content items that includes the spherical video content item using the techniques described in blocks 404-414.

As described above, the spherical video content item can be any suitable type of video content that includes multiple views recorded from any suitable number of cameras that are stitched together to form a video content item that can be manipulated in viewpoint and navigated through by a user. In some embodiments, the spherical video content item can include a still image with multiple views that has been replicated across multiple frames. Note that, in some embodiments, the spherical video content item can be encoded as a two-dimensional video, for example, as a projection of the spherical video content onto a rectangular plane.

Process 400 can identify a frame of the spherical video content item at 404. In some embodiments, process 400 can identify the frame in any suitable manner. For example, in some embodiments, process 400 can start with a first frame of the spherical video content item. As another example, in some embodiments, process 400 can select a frame from a middle portion of the spherical video content item.

At 406, process 400 can divide the frame of the spherical video content item into multiple tiles that span the frame. It should be noted that the size of each tile can be of any suitable size. For example, in some embodiments, the size of a tile can correspond to a size of a viewport corresponding to a viewpoint of a viewer located at the center of the spherical video content item looking at the tile. Alternatively, in some embodiments, the size of a tile can be either smaller or larger than the size of the viewport. Note that, in some embodiments, the multiple tiles can be of different sizes (e.g., the set of tiles in the center of the frame have a size larger than the set of tiles on the periphery of the frame).

It should be noted that the viewable perspective of the spherical video content item can be represented as a portion of a sphere. For example, process 400 can divide the spherical representation of the spherical video content item into multiple tiles similar to the division shown in FIG. 1B, where a spherical image is mapped to a two-dimensional representation of the spherical image. The mapping can include mapping a frame of a spherical video or image to a two-dimensional representation based on a spherical projection. These tiles can, for example, tile the surface of the sphere.

In some embodiments, process 400 can determine a size of the tiles based on any suitable information. For example, in some embodiments, the size can be determined experimentally and can be modified over time based on the effectiveness of tiles of a particular size in identifying particular types of content. As a more particular example, in some embodiments, process 400 can use the largest sized tile (and therefore uses the least computational time to analyze the spherical video content item) that is effective for detecting a particular type of content. As another example, in some embodiments, process 400 can use smaller tiles in regions of the spherical video content item that are determined to have a lot of color variation and larger tiles in regions of the spherical video content item that are determined to have less color variation. As yet another example, in some embodiments, the size of the tiles can be determined based on any other suitable information, such as a genre of the content associated with the spherical video content item, an identity of a creator of the spherical video content item, and/or any other suitable information.

At 408, process 400 can determine, for each tile of the frame of the spherical video content item, a probability (i.e., a probability value) that the tile contains content that is to be analyzed further. For example, in some embodiments, the probability can indicate a probability that the tile contains content in motion, the probability that the tile contains a border or edge that is part of a panel (e.g., a rectangular panel, a square panel, and/or a panel of any other suitable shape) in which a particular video content item is being presented, and/or any other suitable probability.

Process 400 can use any suitable technique or combination of techniques to calculate the probability. For example, in some embodiments, process 400 can calculate a probability that the content of the tile includes motion. In some such embodiments, process 400 can determine the probability that the content of the tile includes motion by comparing two or more frames that include the tile. In some embodiments, process 400 can use any suitable algorithms or techniques to estimate motion. For example, in some embodiments, process 400 can estimate motion using pixel-based methods (e.g., optical flow, phase correlation, and/or any other suitable technique or combination of techniques). As another example, in some embodiments, process 400 can estimate motion using feature-based methods. As a more particular example, in some such embodiments, process 400 can identify one or more features present in the tile (e.g., an edge, a corner, a border, a particular shape, and/or any other suitable feature) and can compare corresponding features across multiple frames including the tile.

As another example, in some embodiments, process 400 can calculate a probability that the tile includes a border and/or an edge. As a more particular example, in some embodiments, the border and/or the edge can correspond to a border of a video window that contains a presentation of a particular video content item (e.g., a copyrighted video content item). As shown in the specific example of FIG. 1D, process 400 can determine if a tile 162 includes a border 164 of the video window in which a video content item is being presented, where the video window is superimposed on the spherical video content item.

Note that, in some embodiments, process 400 can identify a border of a video window or panel in which a video content item is being presented within the spherical video content item in any other suitable manner. For example, in some embodiments, process 400 can calculate a probability that a window of any suitable size (e.g., in pixels, in inches, and/or in any other suitable metric) contains an edge or border, and can calculate a matrix and/or a heat map of probabilities for the spherical video content item by sliding the window over the spatial extent of the spherical video content item projected on a two-dimensional plane. A more particular example of a matrix or heat map of probabilities may include: [0.0001, 0.0002, . . . 0.0123; 0.0001, 0.8, . . . 0.7; . . . ], thereby indicating that this particular frame has a relatively higher probability of having a border or edge in a location corresponding to the second row of the matrix. In some such embodiments, process 400 can average the computed probabilities across multiple frames. Process 400 can then identify spatial locations within the spherical video content item that are most likely to contain a border or edge (e.g., based on the probabilities, based on the averaged probabilities, and/or in any other suitable manner).

As yet another example, in some embodiments, process 400 can calculate a probability that the content of the tile represents a particular type of object, such as a face, an animal, a logo, a particular actor, text, and/or any other suitable type of object. In some such embodiments, process 400 can use any suitable type of image recognition techniques to identify particular types of object within the tile.

In some embodiments, any suitable type of classifiers or other machine learning techniques can be used in addition to and/or instead of the techniques described above. For example, in some embodiments, process 400 can use a classifier (e.g., a support vector machine, logistic regression, a perceptron, and/or any other suitable type of classifier) to calculate a probability that the tile contains content that is to be further analyzed. As a more particular example, the classifier can be used to calculate a likelihood that a tile and/or a window contain a border corresponding to a video player panel in which copyrighted video content is being presented, a likelihood that a tile and/or window contain a particular type of object (e.g., a face, a logo, and/or any other suitable type of object), and/or any other suitable classification. In some such embodiments, process 400 can use weights and/or factors associated with the classifier that were determined based on any suitable training set of data composed of tiles from other spherical video content items.

Note that, in some embodiments, process 400 can calculate, for each tile, the probability that the tile includes content that is to be analyzed further using a combination of information. For example, in some embodiments, the probability can represent a combination of a first probability that the tile includes content in motion and a second probability that the tile includes a specific type of object (e.g., a face, and/or any other suitable type of object). In some such embodiments, the multiple sources of information can be combined in any suitable manner, such as a weighted average.

At 410, process 400 can determine whether the probability exceeds a predetermined threshold. In some embodiments, the threshold can be any suitable value (e.g., 50%, 70%, 90%, and/or any other suitable value). In some embodiments, process 400 can set the threshold value based on any suitable information. For example, in some embodiments, process 400 can set the threshold value based on a distribution of the probability values for all of the tiles that have been analyzed. As a more particular example, in some embodiments, process 400 can set the threshold such that fewer than a predetermined number of tiles (e.g., fewer than 50, fewer than ten, and/or any other suitable number) of tiles exceed the threshold and/or such that fewer than a predetermined fraction of the total number of tiles (e.g., fewer than 10%, fewer than 20%, and/or any other suitable fraction) exceed the threshold. As another example, in some embodiments, process 400 can set the threshold value based on a size of the tile. As a more particular example, in instances where the size of the tile corresponds to a relatively smaller portion of the spherical video content item, process 400 can set the threshold value to be higher relative to instances where the size of the tile is a larger portion of the spherical video content item. In some embodiments, process 400 can modify the threshold value over time, for example, based on performance. As a more particular example, in instances when process 400 determines that a particular threshold value has allowed tiles that should have been flagged to not be flagged, process 400 can adjust the threshold value to a lower number. As another more particular example, in instances where process 400 determines that a particular threshold value has flagged more than a predetermined number or more than a predetermined proportion of tiles that were then manually determined to not be tiles that should have been flagged, process 400 can adjust the threshold value to a higher number.

If, at 410, it is determined that the probability does not exceed the threshold value ("no" at 410), process 400 can proceed to block 412 and can discard the tile. After analyzing any suitable number of the tiles identified at block 406 in this manner (e.g., all of the tiles, a suitable subset of the tiles, and/or any other suitable number), process 400 can loop back to block 404 and can identify a different frame of the spherical video content item. For example, in some embodiments, process 400 can identify the next frame of the spherical video content item. As another example, in some embodiments, process 400 can skip a predetermined number of frames (e.g., five frames, ten frames, twenty frames, and/or any other suitable number) to identify the different frame of the spherical video content item.

If, at 410, it is determined that the probability does exceed the threshold value ("yes" at 410), process 400 can proceed to block 414 and can further analyze the content of the tile. For example, in some embodiments, process 400 can perform any suitable fingerprinting techniques (e.g., a video fingerprint, an audio fingerprint, and/or any other suitable type of fingerprinting analysis) to determine if the content of the tile matches a reference content item. As a more particular example, in some embodiments, process 400 can determine, using the fingerprinting technique(s), whether the content of the tile matches any content item within a database of reference content items (e.g., a database of copyrighted videos, a database of copyrighted audio tracks, and/or any other suitable content items). In some embodiments, process 400 can combine audio fingerprinting techniques and video fingerprinting techniques. Additionally, in instances where process 400 utilizes an audio fingerprinting technique, process 400 can determine if audio content of the tile matches a reference audio content item played at a modified speed (e.g., sped up, slowed down, and/or modified in speed by any suitable factor).

In some embodiments, process 400 can perform any suitable processing prior to analyzing the content of a tile. For example, in some embodiments, process 400 can determine that only a subset of the spatial region of the tile is to be analyzed. In some such embodiments, process 400 can center the selected subset of the spatial region within a particular viewport, project the selected subset of the spatial region on a rectangular plane to minimize visual distortions of the selected subset of the spatial region, and/or perform any other suitable processing.

Note that, in some embodiments, if it is determined that content of the tile matches a reference content item, the tile and/or the spherical video content item itself can be tagged and/or marked in any suitable manner. For example, in some embodiments, process 400 can tag an identifier of the spherical video content item, thereby causing the spherical video content item to be flagged for manual review to determine if the spherical video content item contains a particular video content item (e.g., a particular copyrighted video content item, and/or any other suitable type of content). In some such embodiments, the output of process 400 can include any other suitable information, such as a frame number corresponding to the flagged tile, an identifier of the reference content item that produced a match to the content of the flagged tile, and/or any other suitable information.

In some embodiments, process 400 can inhibit or block the spherical video content item from being presented to other viewers as it likely contains a copyrighted video content item. For example, process 400 can cause a warning message or takedown message to be presented in place of the spherical video content item. In another example, process 400 can modify the spherical video content item (e.g., prevent movement to particular viewpoints, alter the video and/or audio content associated with the spherical video content item, etc.).

Process 400 can then loop back to block 404 and identify a different frame of the spherical video content item, as described above.

Note that, in some embodiments, process 400 can terminate prior to analyzing all of the frames of the spherical video content item. For example, in some embodiments, process 400 can determine if particular stopping criteria have been met, and if so, can terminate analysis of the spherical video content item. As a more particular example, in some embodiments, the stopping criteria can include whether more than a predetermined number of tiles have been flagged as including content that matches a reference content item, as described above in connection with block 414.

In accordance with some embodiments of the disclosed subject matter, mechanisms for identifying a portion of a frame of a spherical video content item that is likely to include an embedded video item (e.g., identifying an area within a two-dimensional projected region of a selected frame which meets a criterion indicative of the region having a likelihood above a threshold of including an embedded video content item) can be provided. Such spherical fingerprinting mechanisms can be used, for example, in response to receiving a request to upload a spherical video content item to a content database. In a more particular example, the mechanisms can be used to perform a spherical fingerprint analysis to identify an embedded video item within a spherical video content item at the time of upload (e.g., as opposed to offline processing).

Figure 5:
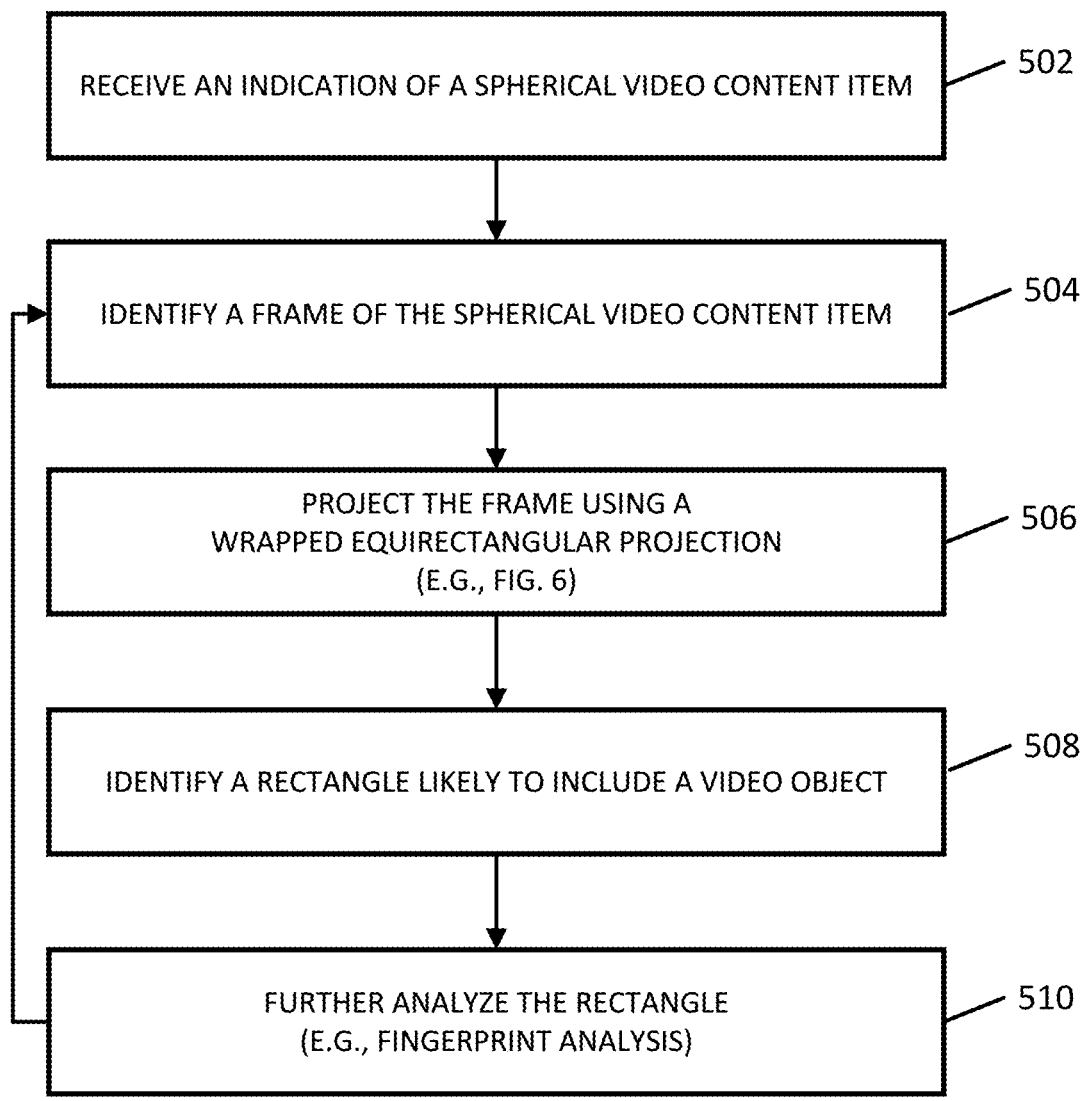
FIG. 5 shows an illustrative example of a process for detecting a region of a spherical video content item which meets a criterion indicative of the region having a likelihood above a threshold of including an embedded video in accordance with some embodiments of the disclosed subject matter.

Turning to FIG. 5, an illustrative example 500 of a process for identifying a portion of a spherical video content item likely to include an embedded video item is shown in accordance with some embodiments of the disclosed subject matter. In some embodiments, blocks of process 500 can be implemented on server(s) 202.

Process 500 can begin by receiving an indication of a spherical video content item at 502. In some embodiments, the indication can be received in any suitable manner. For example, in some embodiments, process 500 can detect that the spherical video content item has been uploaded or has requested to be uploaded to server(s) 202 by a content creator (e.g., using an interface for uploading a video content item, using an application programming interface for uploading multiple video content items that can include a spherical video content item, etc.). As another example, in some embodiments, process 500 can process a group of spherical video content items that includes the spherical video content item using the techniques described in blocks 504-510.

As described above, the spherical video content item can be any suitable type of video content that includes multiple views recorded from any suitable number of cameras that are stitched together to form a video content item that can be manipulated in viewpoint and navigated through by a user. In some embodiments, the spherical video content item can include a still image with multiple views that has been replicated across multiple frames. Note that, in some embodiments, the spherical video content item can be encoded as a two-dimensional video, for example, as a projection of the spherical video content onto a rectangular plane.

Process 500 can identify a frame of the spherical video content item at 504. In some embodiments, process 500 can identify the frame in any suitable manner. For example, in some embodiments, process 500 can start with a first frame of the spherical video content item. As another example, in some embodiments, process 500 can select a frame from a middle portion of the spherical video content item.

At 506, process 500 can project the frame of the spherical video content item using a projection, such as a modified equirectangular projection. In some embodiments, the modified equirectangular projection can include any suitable number of rectangles, each representing a particular angle range of the frame of the spherical video content item. For example, in some embodiments, a rectangle included in the modified equirectangular projection can span a particular yaw range (e.g., −30 degrees to 30 degrees, −35 degrees to 35 degrees, and/or any other suitable yaw range) and a particular pitch range (e.g., −25 degrees to 25 degrees, −30 degrees to 30 degrees, and/or any other suitable pitch range) on the frame of spherical content item. Note that, in some embodiments, rectangles included in the modified equirectangular projection can span different angles relative to each other. For example, in some embodiments, a rectangle at a top portion of the modified equirectangular projection representing content near a top pole of the frame of the spherical video content item can span a smaller angle range of the frame of the spherical video content item relative to a rectangle in a middle portion of the modified equirectangular projection.

Figure 6:
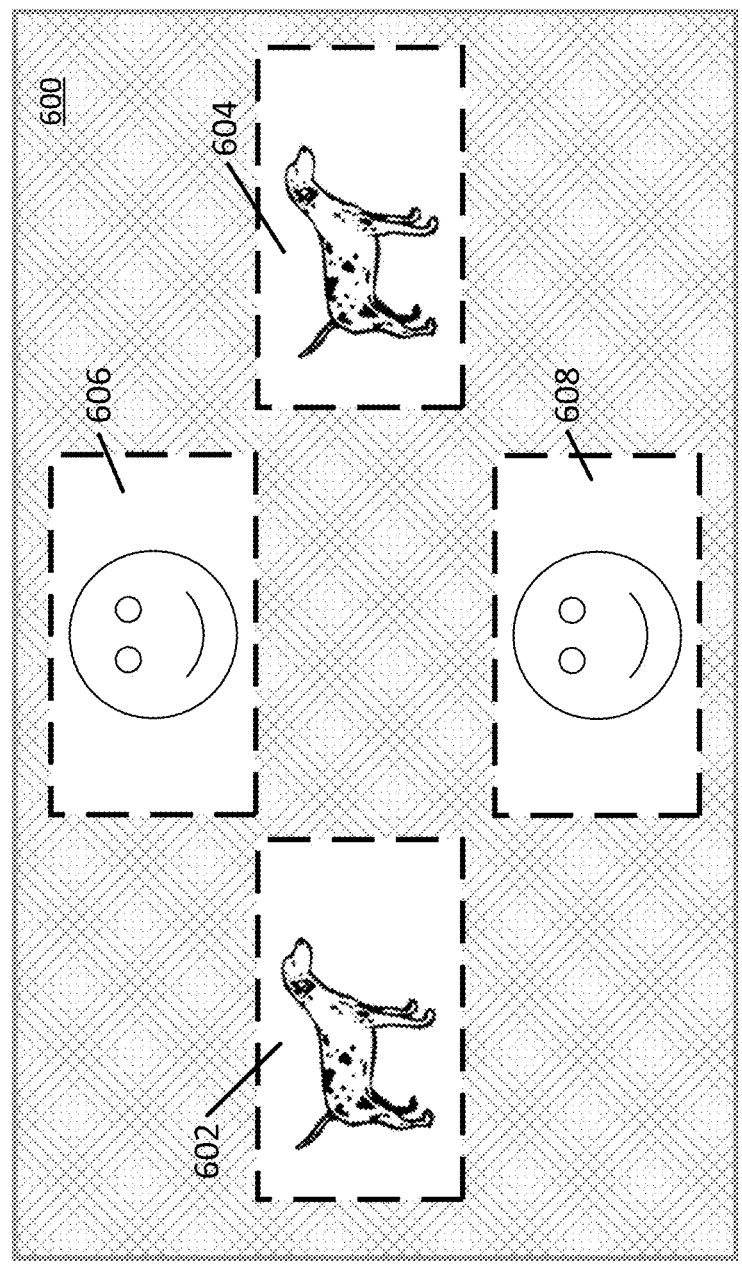
FIG. 6 shows an illustrative example of a schematic diagram for projecting a spherical video using an equirectangular projection in accordance with some embodiments of the disclosed subject matter.

An illustrative example of a modified equirectangular projection 600 of a frame of a spherical video content item is shown in FIG. 6. As illustrated, projection 600 can be modified to include an expanded range of the frame of the spherical video content item. For example, in some embodiments, an expanded image of the frame of the spherical video content item can be wrapped around the equator and/or through the poles. As a more particular example, in some embodiments, the modified equirectangular projection 600 can include redundant portions. As a specific example, rectangles 602 and 604 can be redundant portions of the frame of the spherical video content item, and can be located on a left side and a right side of the modified equirectangular projection 600, respectively. As another specific example, rectangles 606 and 608 can be redundant portions of the frame of the spherical video content item that were located at or near poles of the frame of the spherical video content item, and rectangles 606 and 608 can be located on a top side and a bottom side of the modified equirectangular projection 600. Note that, although modified equirectangular projection 600 includes redundant rectangles 602 and 604 and redundant rectangles 606 and 608, in some embodiments, modified equirectangular projection 600 can include any suitable number of redundant rectangles (e.g., zero, one, five, ten, and/or any other suitable number).

It should be noted that process 500 can project a selected frame of the spherical video content item to a two-dimensional region using modified equirectangular projection 600 defined by a mapping according to which neighboring points of the frame are mapped to respective neighboring points of the region, and one or more contiguous portions of the frame are each mapped to a corresponding plurality of contiguous portions of the region. In continuing this example, two or more spaced apart contiguous portions of the frame can be each mapped to two corresponding portions of the region. It should also be noted that the two-dimensional region can be spanned by first and second transverse axes, where a first contiguous portion of the frame can be mapped to two portions of the region which have different positions with respect to the first axis and a second contiguous portion of the frame can be mapped to two portions of the region which have different positions with respect to the second axis. It should further be noted that, in some embodiments, process 500 can define a coordinate system for the frame based on a latitude and a longitude, where the longitude corresponds to the first axis and the latitude corresponds to the second axis and where the first contiguous portion of the sphere includes a pole according to the coordinate system.

Turning back to FIG. 5, at 508, process 500 can identify a rectangle included in the modified equirectangular projection that is likely to include a video content item (e.g., a two-dimensional video content item, and/or any other suitable type of video content item) embedded in the spherical video content item. For example, process 500 can identify a rectangular area within a two-dimensional projected region of a selected frame of a spherical video content item which meets a criterion indicative of the region having a likelihood above a threshold of including a video content item. In some embodiments, process 500 can identify the rectangle using any suitable technique or combination of techniques.

For example, in some embodiments, process 500 can use any suitable object recognition techniques to identify particular objects within the modified equirectangular projection (e.g., a face, a person, a particular character, a logo, and/or any other suitable object(s)).

As another example, in some embodiments, process 500 can use any suitable image recognition techniques to identify a rectangle included in the modified equirectangular projection that are anomalous from a surrounding portion of the modified equirectangular projection (e.g., where a rectangle or any suitable portion can be deemed as an anomalous portion by meeting a criterion indicative of having at least one property which is different from the surrounding portion of the modified equirectangular projection). As a more particular example, in some embodiments, process 500 can identify a rectangle that includes colors substantially different from a surrounding portion of the modified equirectangular projection. As another more particular example, in some embodiments, process 500 can identify edges within the modified equirectangular projection, and can identify a rectangle included in the modified equirectangular projection that includes a broken or discontinuous edge relative to a surrounding portion of the modified equirectangular projection.

As another example, in some embodiments, process 500 can identify a rectangle included in the equirectangular projection that is likely to include motion using any suitable motion vector detection or identification techniques.

Note that, in some embodiments, process 500 can identify a rectangle located in any suitable area within the modified equirectangular projection. Additionally, note that, in some embodiments, process 500 can identify multiple rectangles within the modified equirectangular projection. For example, in an instance where a video content item is embedded at or near a pole of the spherical video content item, process 500 can identify a rectangle located in a top portion of the modified equirectangular projection and a redundant rectangle located in a bottom portion of the modified equirectangular projection, as shown in and described above in connection with FIG. 6.

In some embodiments, process 500 can calculate a probability that the identified rectangle includes an embedded video content item. For example, in some embodiments, the probability can be based on how anomalous the rectangle is relative to a surrounding portion of the modified equirectangular projection (e.g., where the probability can be calculated using a parameter indicative of the rectangle having at least one property which is different from the surrounding portion of the modified equirectangular projection). In some embodiments, process 500 can proceed to block 510 in response to determining that the probability exceeds a predetermined threshold (e.g., greater than 0.5, greater than 0.75, and/or any other suitable threshold). Conversely, in some embodiments, process 500 can either terminate or loop back to block 504 in response to determining that the probability does not exceed the predetermined threshold.

At 510, process 500 can further analyze the identified rectangle. For example, in some embodiments, process 500 can perform any suitable video fingerprinting technique(s) on content in the identified rectangle to identify a video content item included in the identified rectangle. For example, in some embodiments, the identified video content item can be any suitable video content item, such as a television show, a movie, live-streamed video content, and/or any other suitable video content item. In some embodiments, process 500 can perform the video fingerprinting technique(s) in any suitable manner. For example, in some embodiments, process 500 can calculate any suitable video fingerprints of the identified rectangle, and can compare the video fingerprints to a reference database of fingerprints of known video content items (e.g., a database of copyrighted media content, and/or any other suitable database) to identify a corresponding video content item.

Note that, in some embodiments, process 500 can additionally or alternatively perform any suitable audio fingerprinting technique(s) to identify, for example, a copyrighted audio track associated with the frame of spherical video content item. In some embodiments, process 500 can combine any suitable video fingerprinting and audio fingerprinting techniques. Additionally, in instances where process 500 performs audio fingerprinting techniques, process 500 can identify a copyrighted audio track that has been modified in any suitable manner, such as sped up, slowed down, shifted in frequency, and/or modified in any other suitable manner, as described above in more detail in connection with 414 of FIG. 4.

In some embodiments, in response to identifying a video content item and/or an audio content item associated with the identified rectangle of the modified equirectangular projection (e.g., a copyrighted video content item, a copyrighted audio content item, and/or any other suitable media content item), process 500 can perform any suitable action. For example, in some embodiments, process 500 can remove the spherical video content item from a video sharing service to which it was uploaded and/or block presentation of the spherical video content item. As another example, in some embodiments, process 500 can flag the spherical video content item and/or the identified rectangle in any suitable manner. As a more particular example, in some embodiments, process 500 can transmit an indication of the rectangle and/or the spherical video content item to any suitable entity, such as an administrator of a video sharing service to which the spherical video content item was uploaded, a creator of the spherical video content item, and/or to any other suitable entity. As yet another example, in some embodiments, process 500 can store an indication of a media content item that matches the content in the identified rectangle of the modified equirectangular projection in connection with an identifier of the spherical video content item, for example, in a server hosting the spherical video content item.

In some embodiments, at least some of the above described blocks of the processes of FIGS. 4 and 5 can be executed or performed in any order or sequence not limited to the order and sequence shown in and described in connection with the figures. Also, some of the above blocks of FIGS. 4 and 5 can be executed or performed substantially simultaneously where appropriate or in parallel to reduce latency and processing times. Additionally or alternatively, some of the above described blocks of the processes of FIGS. 4 and 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media. The set of instructions may be referred to as a computer program product (e.g. an item of commerce which can be hired or purchased).

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for analyzing spherical video content and, more particularly, for detecting two-dimensional videos placed on a sphere in abusive spherical video content by tiling the sphere are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for analyzing spherical video content, the method comprising:
   selecting a frame of a spherical video content item;
   projecting the frame of the spherical video content item to a two-dimensional region using a projection defined by a mapping according to which neighboring points of the frame are mapped to respective neighboring points of the region and to which one or more contiguous portions of the frame are each mapped to a corresponding plurality of contiguous portions of the region;
   identifying an area within the region which meets a criterion indicative of the region having a likelihood above a threshold of including a particular type of content; and
   in response to determining that the probability of the area within the region including the particular type of content is above the threshold, inhibiting the spherical video content item from being presented.

2. The method of claim 1, further comprising:
   analyzing the identified area of the region using a video fingerprinting technique in response to identifying the area within the region which meets the criterion; and
   generating an indication of the match in association with the identifier of the spherical video content item in response to determining that content associated with the identified area of the region matches a reference content item of a plurality of reference content items using the video fingerprinting technique.

3. The method of claim 2, further comprising, in response to determining that content associated with the identified area of the projection matches the reference content item using the video fingerprinting technique, blocking the spherical video content item from presentation on a user device.

4. The method of claim 2, wherein the plurality of reference content items is a plurality of copyrighted media content items.

5. The method of claim 1, wherein two or more contiguous portions of the frame, each of the contiguous portions being spaced from other contiguous portions, are each mapped to two corresponding portions of the region.

6. The method of claim 5, wherein the two-dimensional region is spanned by first and second transverse axes, and wherein a first contiguous portion of the frame is mapped to two portions of the region which have different positions with respect to the first axis and a second contiguous portion of the frame is mapped to two portions of the region which have different positions with respect to the second axis.

7. The method of claim 6, further comprising defining a coordinate system for the frame based on a latitude and a longitude of a sphere, wherein the longitude corresponds to the first axis and the latitude corresponds to the second axis.

8. The method of claim 7, wherein the first contiguous portion of the sphere includes a pole according to the coordinate system.

9. The method of claim 1, wherein identifying the region which meets the criterion indicative of the region having the likelihood above the threshold of including the particular type of content is based on an object recognition technique applied to the projection.

10. The method of claim 1, wherein the particular type of content included in the identified area within the region is a two-dimensional video content item.

11. A system for analyzing spherical video content, the system comprising:
    a hardware processor that:
    selects a frame of a spherical video content item;
    projects the frame of the spherical video content item to a two-dimensional region using a projection defined by a mapping according to which neighboring points of the frame are mapped to respective neighboring points of the region and to which one or more contiguous portions of the frame are each mapped to a corresponding plurality of contiguous portions of the region;
    identifies an area within the region which meets a criterion indicative of the region having a likelihood above a threshold of including a particular type of content; and
    in response to determining that the probability of the area within the region including the particular type of content is above the threshold, inhibits the spherical video content item from being presented.

12. The system of claim 11, wherein the hardware processor further:
    analyzes the identified area of the region using a video fingerprinting technique in response to identifying the area within the region which meets the criterion; and
    generates an indication of the match in association with the identifier of the spherical video content item in response to determining that content associated with the identified area of the region matches a reference content item of a plurality of reference content items using the video fingerprinting technique.

13. The system of claim 12, wherein the hardware processor further, in response to determining that content associated with the identified area of the projection matches the reference content item using the video fingerprinting technique, blocks the spherical video content item from presentation on a user device.

14. The system of claim 12, wherein the plurality of reference content items is a plurality of copyrighted media content items.

15. The system of claim 11, wherein two or more contiguous portions of the frame, each of the contiguous portions being spaced from other contiguous portions, are each mapped to two corresponding portions of the region.

16. The system of claim 15, wherein the two-dimensional region is spanned by first and second transverse axes, and wherein a first contiguous portion of the frame is mapped to two portions of the region which have different positions with respect to the first axis and a second contiguous portion of the frame is mapped to two portions of the region which have different positions with respect to the second axis.

17. The system of claim 16, wherein the hardware processor further defines a coordinate system for the frame based on a latitude and a longitude of a sphere, wherein the longitude corresponds to the first axis and the latitude corresponds to the second axis.

18. The system of claim 17, wherein the first contiguous portion of the sphere includes a pole according to the coordinate system.

19. The system of claim 11, wherein identifying the region which meets the criterion indicative of the region having the likelihood above the threshold of including the particular type of content is based on an object recognition technique applied to the projection.

20. The system of claim 11, wherein the particular type of content included in the identified area within the region is a two-dimensional video content item.

21. A non-transitory computer-readable medium containing computer-executable instructions that, when executed by a processor, cause the processor to perform a method for analyzing spherical video content, the method comprising:
    selecting a frame of a spherical video content item;
    projecting the frame of the spherical video content item to a two-dimensional region using a projection defined by a mapping according to which neighboring points of the frame are mapped to respective neighboring points of the region and to which one or more contiguous portions of the frame are each mapped to a corresponding plurality of contiguous portions of the region;
    identifying an area within the region which meets a criterion indicative of the region having a likelihood above a threshold of including a particular type of content; and
    in response to determining that the probability of the area within the region including the particular type of content is above the threshold, inhibiting the spherical video content item from being presented.

* * * * *